(12) United States Patent
Azenkot et al.

(10) Patent No.: US 10,411,918 B1
(45) Date of Patent: Sep. 10, 2019

(54) RECEIVER SUPPORTING MULTIPLE DATA RATES

(71) Applicant: MACOM Technology Solutions Holding, Inc., Lowell, MA (US)

(72) Inventors: Yehuda Azenkot, San Jose, CA (US); Bart Zeydel, El Dorado Hills, CA (US); Georgios Takos, Mountain View, CA (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 0 days.

(21) Appl. No.: 16/045,255

(22) Filed: Jul. 25, 2018

(51) Int. Cl.
*H04L 25/03* (2006.01)
*H04B 1/16* (2006.01)

(52) U.S. Cl.
CPC ......... *H04L 25/03057* (2013.01); *H04B 1/16* (2013.01)

(58) Field of Classification Search
CPC . H04L 25/03273; H04L 25/03; H04L 7/0334; H04L 27/01; H04L 7/0079; H04L 2025/03509; H03M 1/145; H04B 10/6971; H04B 3/235; H04B 10/2941; H04B 1/0475; H04B 1/0071; H04B 1/1036; H04B 1/18; H04B 1/16; H04B 10/5059; H04B 10/615; H04B 1/0046; H04Q 2213/03; H03D 2200/005; H03H 17/0657; H03H 17/0664

See application file for complete search history.

(56) References Cited

U.S. PATENT DOCUMENTS 7,656,945 B1 * 2/2010 Warner ............. H04L 25/03038
375/233

* cited by examiner

*Primary Examiner* — Rahel Guarino

(57) ABSTRACT

A receiver capable of receive and process data signals of multiple baud rates by using an equalizer that is disposed upstream of a decimator. The receiver includes an equalizer coupled to an output of an analog-to-digital converter (ADC), and a decimator couple to the output of the equalizer. The ADC and the equalizer both operate in full rates even in the case of lower data rate, e.g., half or quarter data rate. As the equalizer inherently can inherent remove high frequency noise as well as perform equalization, it practically functions as a low pass filter (LPF). Thereby, there is no need to introduce an extra dedicate LPF upstream of the decimator. This can advantageously and significantly simplify circuitry design and reduce latency.

20 Claims, 3 Drawing Sheets

RECEIVER SUPPORTING MULTIPLE DATA RATES

TECHNICAL FIELD

The present disclosure relates generally to the field of signal processing in communications and, more specifically, to the field of timing recovery mechanisms in signal processing.

BACKGROUND OF THE INVENTION

In communications systems, a transmitter sends data streams to a receiver in symbols, such as bits of data. As the receiver clock is typically not synchronized with the transmitter clock, the receiver needs to correctly recover the clock from the received signal itself. In addition, when data is transmitted over a communication channel, it is usually distorted in terms of phase and amplitude due to various types of noise, such as fading, oscillator drift, frequency and phase offset, and receiver thermal noise. At the receiver, the system is also subject to noise and timing jitter in a time domain. Therefore, the receiver needs a timing recovery process to obtain symbol synchronization, particularly to correct the clock delay and derive the optimal clock phase that is used to sample the received signal and achieve the best Signal-to-Noise Ratio (SNR).

In some systems, a receiver is required to support multiple data rates, such as a full data rate (e.g., 50 Gbps) as well as a half (25 Gbps) and/or a quarter data rate (12.5 Gbps). Herein, the maximum data rate that the multi-rate receiver is capable of supporting is referred as the full rate, and a half rate refers to a data rate that is half of the full rate, etc. It is desirable that such a receiver can be implemented with minimal modifications from a receiver that only supports a single rate (or the full rate). FIG. 1 illustrates a data communication system 100 that includes a receiver capable of supporting multiple data rates in accordance with the prior art.

In a simplified form, the system 100 includes an optical transmitter 110, an optical fiber cable 140, an optical receiver 120 and an electrical receiver 130. Data of different transmission rates can propagate from the optical transmission 110 to the multi-rate electrical receiver 130. The optical transmitter includes a modulator to modulate data according to a modulation scheme, e.g., pulse-amplitude-modulation-4 (PAM-4). The modulated data is sent for transportation through the optical fiber cable 140. The optical receiver 120 operates to receive data from the optical fiber cable 140 and convert the received optical signal to an electrical signal via a photo detector (not shown). The electrical receiver 130 receives the signals from the optical receiver 120 and performs data and clock recovery.

The electrical receiver 130 includes an analog-to-digital converter (ADC) 131, a feed-forward equalizer (FFE) 134, a slicer 135, a timing recovery (TR) module 136 and a phase interpolator (PI) 137. The slicer 135 outputs the recovered and demodulated data based on appropriate constellation thresholds. Both the slicer input and the output are provided to the timing recovery (TR) module 136 for locating the correct sampling phase. The timing recovery module 136 may include a phase detector, a loop filter and a voltage controlled oscillator (VCO) (not shown). The timing recovery module 136 and the phase interpolator 137 in combination with the clock (CLK) feedback path to the ADC form a timing recovery loop.

To support a data rate that is only half and/or a quarter of the full rate, the electric receiver 130 additionally includes a low pass filter (LPF) 132 and a decimator 133 disposed upstream of the equalizer 134. The decimator 133 is configured to downsample the signal output from the LPF 132 by a factor of M, where M is 2 for the case of half rate and 4 for the case of quarter rate. For example, in response to receiving a signal transmitted in a half data rate, the ADC 131 operates in the same rate as in response to a full data rate signal. That is, regardless of the data rate being half of the full rate, the ADC is clocked by the full rate clock signal (CLK) output from the phase interpolator 137 and samples the analog signal in a full sampling rate. For example, for a time-interleaved multi-channel ADC, the full sampling rate can be multiple times of the clock rate. The sampled digital data is then supplied to the LPF 132.

The LPF 132 serves as an anti-aliasing filter that is necessary to remove high frequency noise resulting from the oversampling by the ADC. The LPF 132 can be implemented by using a half-band filter operable to reduce the bandwidth of the sampled data by a factor of 2. Another half-band filter can be added to reduce the bandwidth by a factor of 4. The decimator 133 operates to downsample the LPF output by dropping every second sample (M=2) for the case of half rate, and by dropping 3 for every 4 samples (M=4) for the case of quarter rate.

The FFE 134 receives the decimated signal and operates as a T-spaced equalizer (EQ), where T denotes the nominal symbol period as received at the electrical receiver 130. The equalized signal is then supplied to the slicer 135 to generate the demodulated and recovered data. In parallel, the equalized signal is supplied to the timing recovery module 136 and further to the phase interpolator 137 to generate the recovered clock (CLK) which is fed back to the ADC 131 as well as the downstream circuits that use the recovered clock.

The main drawback of this design is the additional hardware required for implementation of the LPF and the extra latency that the LPF adds to the timing recovery loop. The performance of timing recovery is negatively and significantly impacted as the loop latency becomes high relative to the timing recovery loop bandwidth due to the LPF latency.

SUMMARY OF THE INVENTION

Accordingly, embodiments of the present invention provide a signal receiving mechanism that allows a receiver to support multiple data rates with minimal logic design modifications relative to a receiver designed to only support the full rate, and without introducing latency to the timing recovery loop.

Embodiments of the present invention provide an equalizer-based receiver capable of supporting multiple data rates and having a decimator disposed downstream of the equalizer, whereas the receiver requires no low pass filter (LPF) disposed between the analog-to-digital converter (ADC) and the decimator. More specifically, the equalizer is coupled to the output of an ADC and the decimator is coupled to the output of the equalizer. The output of the decimator is supplied to a slicer and a timing recovery module. The ADC operates in its full operation rate irrespectively of the data rate. The decimator operates to decimate the signal by M (M>1) if the received signal has a lower data rate than the full data rate of the receiver. If the received signal has the full data rate, the decimator is disabled for by-passed.

Because the equalizer itself can inherently perform low pass filtering functions during an equalization process, there is no extra LPF needed to remove the high frequency noise before decimation, which advantageously simplifies the circuitry design and reduces the operational power consumption of the receiver. Also, the latency associated with using an extra LPF can be advantageously eliminated.

For example, upon receiving a half rate signal with the symbol time period being T, the ADC is clocked by a full rate clock and samples the analog data in the full sampling rate. The equalizer receives the digital input signal output from the ADC and generates an equalized signal. The equalizer also operates in its full operation rate and samples the data in its full sample rate. Therefore, the samples in the equalized signal are T/2-spaced. The equalizer output is then decimated by 2 (M=2) to produce a half rate signal with the sample period being T-spaced.

The decimated signal is then supplied to the slicer to make slicer decisions on the symbols based on the proper modulation scheme, and also supplied to the timing recovery module and phase interpolate to output a recovered clock having the full data rate. The recovered clock is fed back to drive the ADC that samples the input analog signal at the full operation rate of the ADC. Hence in this operation mode of the receiver, the ADC, the equalizer and the phase interpolator operate at their full operations rates, whereas the slicer and the timing recovery module operate at their half operation rates.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale, and particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

BRIEF DESCRIPTION OF THE DRAWINGS

Embodiments of the present invention will be better understood from a reading of the following detailed description, taken in conjunction with the accompanying figures, in which like reference characters designate like elements.

RECEIVER SUPPORTING MULTIPLE DATA RATES

Figure 1:
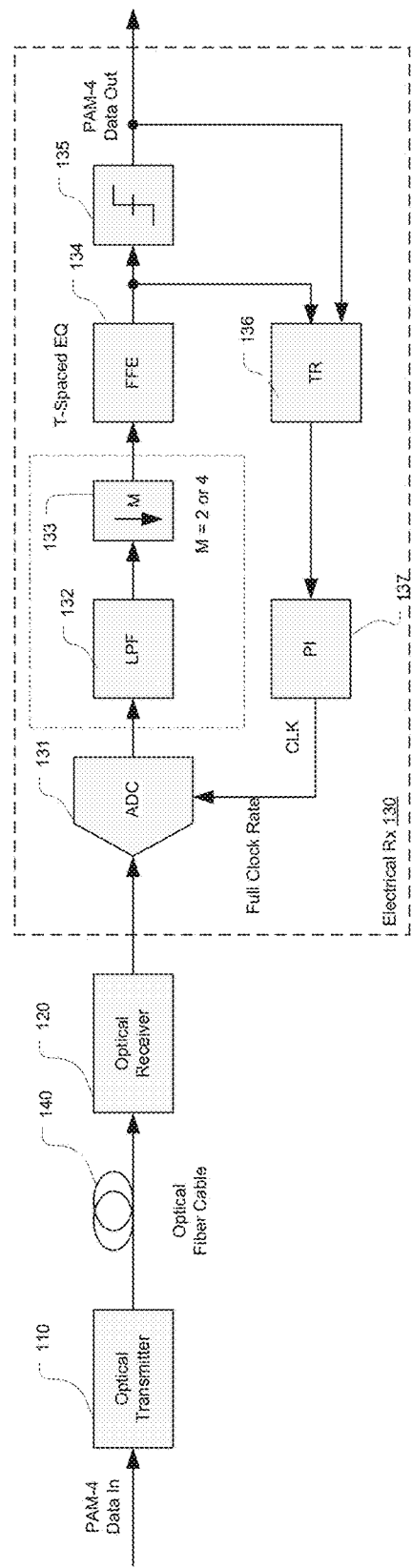
FIG. 1 illustrates a data communication system that includes a receiver capable of supporting multiple data rates in accordance with the prior art.

Overall, embodiments of the present disclosure provide a receiver capable of receive and process data signals of multiple data rates by using an equalizer that is disposed upstream of a decimator. The receiver includes an equalizer coupled to an output of an analog-to-digital converter (ADC), and a decimator couple to the output of the equalizer. The ADC and the equalizer both operate in a full rate even in the case of a lower data rate, e.g., half or quarter data rate. As the equalizer inherently can inherent remove high frequency noise as well as perform equalization, it practically functions as a low pass filter (LPF). Thereby, there is no need to introduce an extra dedicate LPF upstream of the decimator as used in the conventional art shown in FIG. 1. This can advantageously and significantly simplify circuitry design and reduce latency.

Figure 2:
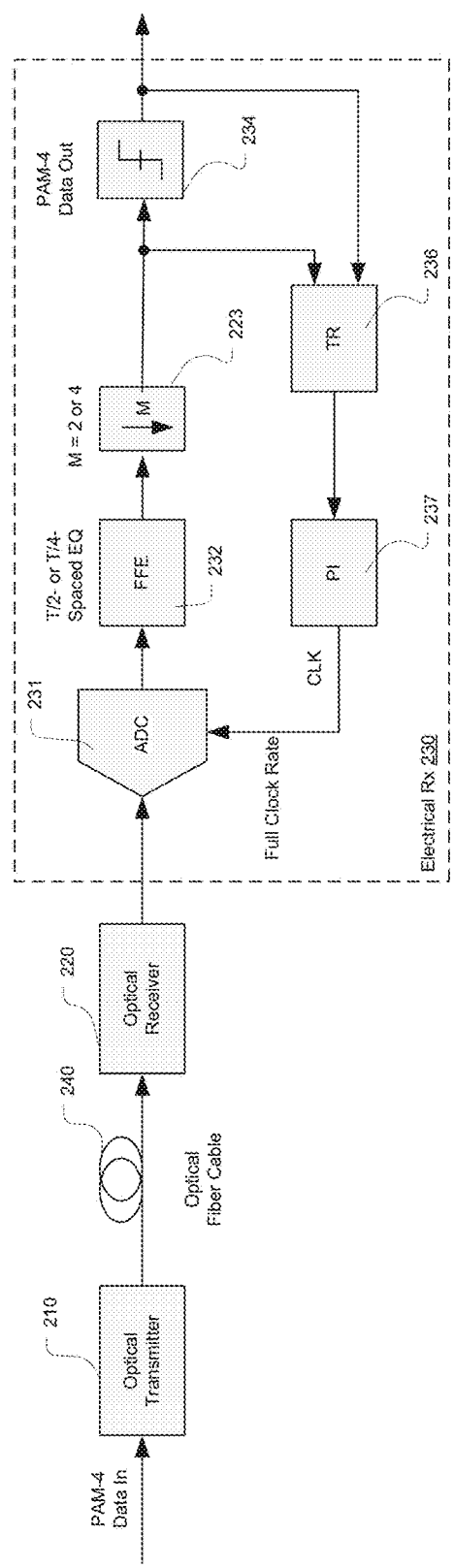
FIG. 2 illustrates a data communication system that includes an exemplary receiver with an equalizer disposed upstream of a decimator in accordance with an embodiment of the present disclosure.

FIG. 2 illustrates a data communication system 200 that includes an exemplary receiver with an equalizer disposed upstream of a decimator in accordance with an embodiment of the present disclosure. For example, the receiver 200 can be configured to supporting a full (maximum) data rate of 50 Gbps, a half data rate of 25 Gbps and a quarter data rate of 12.5 Gbps. However, it will be appreciated that the present disclosure is not limited to any specific data rates or any specific number of rates that a single receiver is configured for. Further a data rate referred herein may correspond to any suitable data rate unit, such as a bit-rate, a baud rate, a symbol rate, a sample rate etc.

In a simplified form, the system 200 includes an optical transmitter 210, an optical fiber cable 240, an optical receiver 220 and an electrical receiver 230. Data of different transmission rates can be propagate from the optical transmission 210 to the multi-rate electrical receiver 230. The optical transmitter 210 may include a driver and a Mach-Zehnder interferometer (MZI) and operate to receive data modulated according to PAM-4. The modulated data is sent for transportation through the optical fiber cable 240. The optical receiver 220 may include a photo detector and a transimpedance amplifier and operates to receive data from the optical fiber cable 240. The electrical receiver 230 receives the signals from the optical receiver 220 and performs data and clock recovery.

The electrical receiver 230 includes an analog-to-digital converter (ADC) 231, a feed-forward equalizer (FFE) 232, a slicer 234, a timing recovery (TR) module 236 and a phase interpolator (PI) 237. The slicer 234 outputs the recovered and demodulated data based on appropriate constellation thresholds. Both the slicer input and the output are provided to the timing recovery module (TR) 236 for locating the correct sampling phase. The timing recovery module 236 may include a phase detector, a loop filter and a VCO (not shown). The timing recovery module 236 and the phase interpolator 237 in combination with the clock feedback path (CLK) to the ADC 231 form a timing recovery loop. To support a data rate that is only half and a quarter, or otherwise a fraction of, the maximum rate, the electric receiver 230 includes a decimator 223 disposed downstream of the FFE 232.

Each component in the system 200 can be implemented in any suitable manner that is well known in the art without departing from the scope of the present disclosure. For example, the FFE 232 may be replaced with a decision-feedback equalizer (DFE) which also includes a feedback filter as the FFE 232.

More specifically, the FFE 232 is coupled to the output of the ADC 231 and the decimator 223 is coupled to the output of the FFE 232. The output of the decimator 223 is supplied to the slicer 234 as well as to the timing recovery module 236 and further to the phase interpolator 237. The ADC 231 operates in its full operation rate regardless of the data rate of the received signal. The decimator 223 operates to decimate the signal by M (M>1) if the received signal has a lower data rate than the full data rate. If the received signal has the full data rate, the decimator is disabled or by-passed.

For example, upon receiving a half rate signal with the symbol time period being T, the ADC 231 is clocked by a full rate clock and oversamples the analog data in the full sampling rate. The FFE 232 receives the digital input signal output from the ADC 231 and generates an equalized signal. The FFE 232 also operates in its full operation rate and samples the data in its full sample rate. For example, the FFE operates in a fractionally-spaced equalizer. Therefore, the samples in the equalized signal are T/2-spaced (and T/4-spaced in the case of quarter rate). The equalizer output is then decimated by 2 (M=2) to produce a half rate signal with the sample period being T-spaced.

The decimated signal is then supplied to the slicer 234 to make slicer decisions on the symbols based on the proper modulation scheme, and also supplied to the timing recovery module 236 for sampling phase recovery and further to the phase interpolate 237 to output a recovered clock (CLK) having the full clock rate. The recovered clock is fed back to drive the ADC 231 that sample the input analog signal at the ADC's full operation rate. For example, the full data rate is 53.125 GHz, and correspondingly the recovered clock frequency is also 53.125 GHz.

Hence in a half-rate operation mode of the receiver, the ADC 231, the FFE 232 and the phase interpolator 237 all operate at their full operation rates, whereas the slicer and the timing recovery module both operate at their half operation rates. By the same token, in a quarter-rate operation mode of the receiver, the A DC 231, the FFE 232 and the phase interpolator 237 all operate at the full operation rates, whereas the slicer and the timing recovery module both operate at the quarter operation rates. On the other hand, if the received signal has a full data rate, all the components 231-237 operate in their full operation rates. It will be appreciated the various components 231-237 may have the same or the different full operation rates.

Because the equalizer disposed upstream of the decimator can effectively perform low pass filtering functions during an equalization process, there is no extra LPF needed to remove the high frequency noise before decimation, which advantageously simplifies the circuitry design and reduces the operational power consumption of the receiver. As a result, the latency associated with using an extra LPF is advantageously eliminated.

It will be appreciated that the electrical receiver 230 may include control logic that can select the proper operation modes for each component therein based on the detected data rate, including enabling or disabling the decimator and choosing the proper M for the decimator. The electrical receiver 230 may also include a wide range of other components that are well known in the art.

Figure 3:
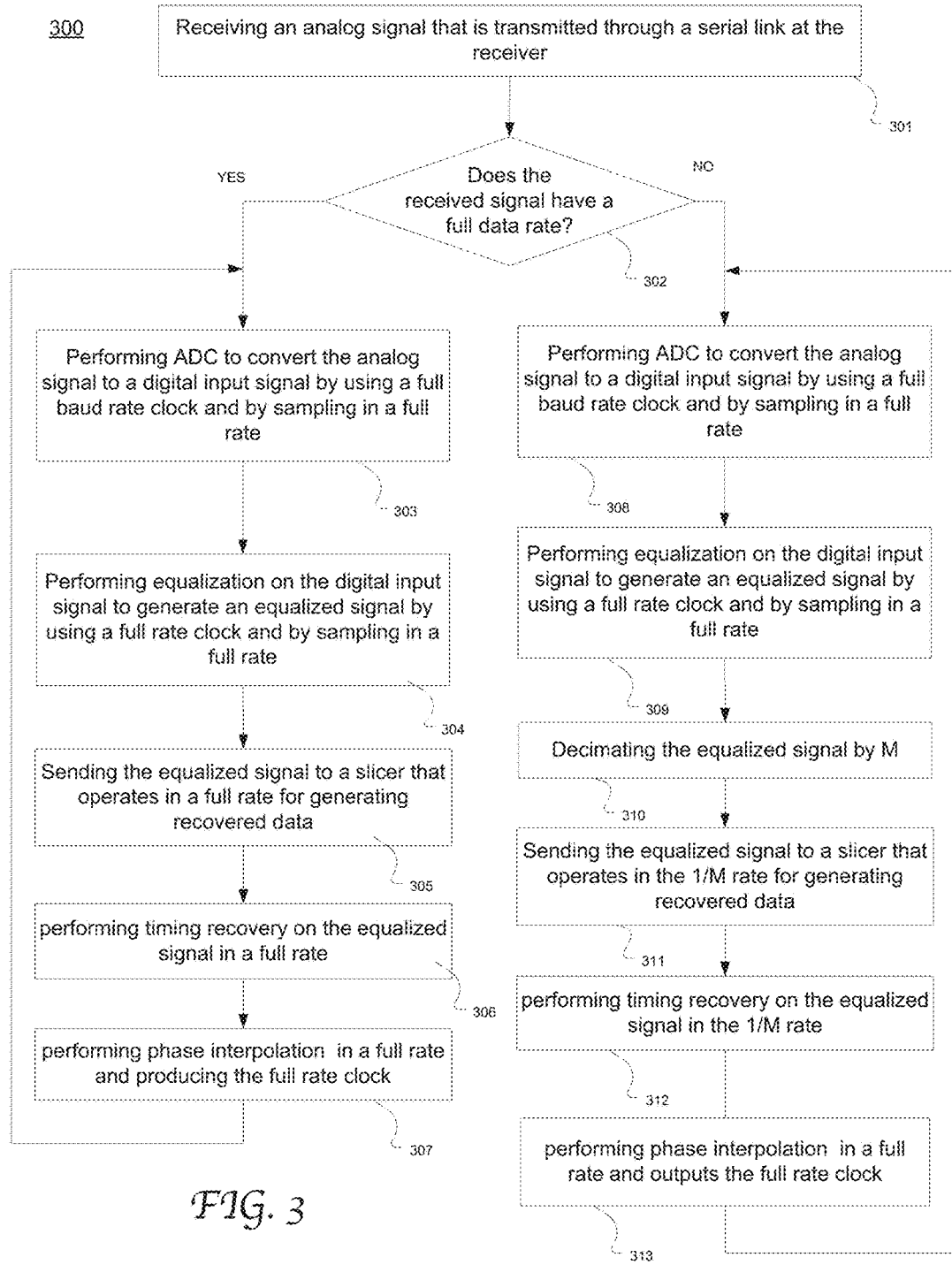
FIG. 3 is a flow chart depicting an exemplary process of data and clock recovery at a multi-rate receiver in accordance with an embodiment of the present disclosure.

FIG. 3 is a flow chart depicting an exemplary process 300 of data and clock recovery at a multi-rate receiver in accordance with an embodiment of the present disclosure.

Process can be performed by the electrical receiver configured as 230 in FIG. 2 for example, but may also be performed by any other suitable hardware logic, software logic, firmware logic, or a combination thereof.

At 301, an input analog signal that is transmitted through a serial link is received at the receiver. At 302, it is determined whether the signal has the full data rate. If yes, at 303 analog-to-digital conversion is performed to convert the input analog signal into a digital input signal by using a full baud rate clock, including sampling the input signal in a full sampling rate. The full sampling rate may be the same as the clock rate in some embodiment, but may also be multiple times of the clock rate in some other embodiments, e.g., by using a multi-channel ADC.

At 304, an equalization process is performed to generate an equalized signal by using the full rate clock and by sampling the digital input signal in a full sampling rate. At 305, the equalized signal is sent to a slicer that operates in a full rate and outputs recovered data. At 306, timing recovery is performed on the equalized signal in a full operation rate of a timing recovery module to produce the correct sampling phase. At 307, phase interpolation is performed in a full operation rate of the phase interpolator to produce the recovered clock which is supplied back for clocking the ADC. Thus, the foregoing loop 303-307 is repeated.

On the other hand, if the received analog signal has a data rate less than the full rate (as determined at 302), namely 1/M rate, analog-to-digital conversion is still performed by using a full rate clock, including sampling the input signal in a full sampling rate. At 309, an equalization process is performed to generate an equalized signal by using the full rate clock and by sampling the digital input signal in a full sampling rate of the equalizer. The equalizer and the ADC may have the same full sampling rate. At 310, the equalized signal is decimated or down-sampled by M to generate a decimated signal.

At 311, the decimated signal is sent to a slicer that operates in 1/M of its full operation rate and outputs recovered data. At 312, timing recovery is performed on the decimated signal in 1/M of the full operation rate of the timing recovery module to produce the correct sampling phase. At 313, phase interpolation is performed in a full operation rate of the phase interpolator to produce the recovered clock which is supplied back for analog-to-digital conversion. Thus, the foregoing loop 308-313 is repeated.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A device of processing signals transmitted via serial links, said device comprising:
   an analog-to-digital converter (ADC) configured to:
      receive a first analog signal having a first data rate;
      sample said first analog signal at a first rate; and
      generate a first digital input signal having a second data rate that is M times of said first data rate, wherein M is an integer greater than 2;
   an equalizer coupled to an output of said ADC and configured to generate a first equalized signal having said second data rate;
   a decimator coupled to an output of said equalizer and configured to: downsample said first equalized signal to a decimated signal having said first data rate;
   a slicer coupled to an output of said decimator; and
   a timing recovery module coupled to said output of said decimator and an output of said slicer.

2. The device of claim 1, wherein said timing recovery module and said slicer are configured to operate at 1/M of respective full operation rates responsive to said first analog signal.

3. The device of claim 2 further comprising a phase interpolator coupled to an output of said timing recovery module and configured to output a clock signal for sampling said first analog signal at said first rate.

4. The device of claim 3,
   wherein said ADC is further configured to:
      receive a second analog signal transmitted in said second data rate;
      sample said second analog signal in said first rate; and
      generate a second digital input signal,
   wherein said equalizer is further configured to: sample said second digital input signal in said first rate; and generate a second equalized signal having said second data rate, wherein said decimator is further configured to be deactivated responsive to said second analog signal.

5. The device of claim 4, wherein said slicer and said timing recovery module are further configured to operate at said respective full operation rates thereof responsive to said second analog signal.

6. The device of claim 5, wherein said phase interpolator is further configured to operate in a full operation rate and generate said clock signal in said first rate responsive to said second analog signal.

7. The device of claim 1, wherein said equalizer comprises a feed-forward equalizer (FFE) configured to operate in a fractionally-spaced mode, and wherein further said timing recovery module comprises a phase interpolator, a phase detector, and a low pass filter.

8. The device of claim 1, wherein no low pass filter is coupled between said equalizer and said decimator.

9. A method of processing received signals of different data rates, said method comprising:
   receiving a first analog signal having a first data rate;
   converting said first analog signal to a first digital input signal by using a clock signal having a first rate during analog-to-digital conversion;
   performing equalization on said first digital input signal to generate a first equalized signal;
   decimating said first equalized signal by M to generate a decimated signal, wherein M is an integer greater than 1; and
   performing timing recovery on said decimated signal to obtain said clock signal having said first rate.

10. The method of claim 9, wherein said timing recovery is performed in 1/M of a full operation rate of a timing recovery module responsive to said first analog signal.

11. The method of claim 9, wherein said equalization is performed in a full operation rate of an equalizer responsive to said first analog signal.

12. The method of claim 11 further comprising:
   receiving a second analog signal that is transmitted in a second data rate that is M times of said first data rate;
   converting said second analog signal to a second digital input signal by using said clock signal having said first rate during analog-to-digital conversion;
   performing equalization in said first full operation rate of said equalizer on said second digital input signal to generate a second equalized signal;
   performing timing recovery on said second equalized signal without decimating to obtain said clock signal having said first rate.

13. The method of claim 9, wherein said first equalized signal propagates from an equalizer to a decimator without passing through a low pass filter in between said equalizer and said decimator.

14. A receiver operable to process received signals of different data rates, said receiver comprising:
   an analog-to-digital converter (ADC) configured to:
      convert a first analog signal having a first data rate to a first digital input signal by using a first rate for sampling; and
      convert a second analog signal having a second data rate to a second digital input signal by using said first rate for sampling, wherein said second data rate is M times of said first data rate, wherein M is an integer greater than 1;
   an equalizer coupled to an output of said ADC and configured to:
      perform equalization on said first digital input signal to generate a first equalized signal by using a full operation rate of said equalizer; and
      perform equalization on said second digital input signal to generate a second equalized signal by using said full operation rate of said equalizer;
   a decimator coupled to an output of said equalizer; and
   a timing recovery module coupled to an output of said decimator.

15. The receiver of claim 14, wherein said decimator is configured to: decimate said first equalized signal by M; and send a decimated signal to said timing recovery module, and wherein further said decimator is configured to be by-passed responsive to said second equalized signal.

16. The receiver of claim 14 further comprising a slicer coupled to said output of said decimator and configured to:
   operate in 1/M of a full operation rate of said slicer responsive to said first analog signal; and
   operate in said full operation rate of said slicer responsive to said second analog signal.

17. The receiver of claim 14 further comprising a phase interpolator coupled between said timing recovery module and said ADC, wherein said phase interpolator is configured to generate a clock signal for supply to said ADC in a same rate responsive to said first analog signal and to said second analog signal.

18. The receiver of claim 14, wherein said timing recovery module is configured to:

perform timing recovery in a 1/M of a full operation rate of said timing recovery module responsive to said first analog signal; and perform timing recovery in said full operation rate of said timing recovery module responsive to said second analog signal.

19. The receiver of claim 14, wherein said equalizer comprises a feed-forward equalizer (FFE) operable to operate in a fractionally-spaced mode.

20. The receiver of claim 14, wherein no low pass filter is coupled between said equalizer and said decimator.

* * * * *